(12) United States Patent
Chaiko et al.

(10) Patent No.: US 10,689,732 B2
(45) Date of Patent: Jun. 23, 2020

(54) METHODS FOR CONTROLLING IRON VIA MAGNETITE FORMATION IN HYDROMETALLURGICAL PROCESSES

(71) Applicant: FLSmidth A/S, Valby (DK)

(72) Inventors: David John Chaiko, South Jordan, UT (US); Frank Baczek, Salt Lake City, UT (US); Sara (Sally) Rocks, Sandy, UT (US)

(73) Assignee: FLSmidth A/S (DK)

( * ) Notice: Subject to any disclaimer, the term of this patent is extended or adjusted under 35 U.S.C. 154(b) by 0 days.

(21) Appl. No.: 16/465,856

(22) PCT Filed: Nov. 30, 2017

(86) PCT No.: PCT/IB2017/057553
§ 371 (c)(1),
(2) Date: May 31, 2019

(87) PCT Pub. No.: WO2018/100539
PCT Pub. Date: Jun. 7, 2018

(65) Prior Publication Data
US 2019/0309391 A1    Oct. 10, 2019

Related U.S. Application Data

(60) Provisional application No. 62/428,895, filed on Dec. 1, 2016.

(51) Int. Cl.
C22B 15/00    (2006.01)
C22B 3/06     (2006.01)
(Continued)

(52) U.S. Cl.
CPC .......... C22B 15/0089 (2013.01); C22B 3/06 (2013.01); C22B 3/44 (2013.01); C22B 15/0067 (2013.01);
(Continued)

(58) Field of Classification Search
CPC .............................. C22B 15/0089; C22B 3/06
(Continued)

(56) References Cited

U.S. PATENT DOCUMENTS 4,150,095 A    4/1979 Kunda et al.

FOREIGN PATENT DOCUMENTS

WO    2007/071020 A1    6/2007

OTHER PUBLICATIONS

Chang Y et al, Removal of iron from acidic leach liquor of lateritic nickel ore by goethite precipitate, Feb. 1, 2010, 84-87.
(Continued)

*Primary Examiner* — Weiping Zhu
(74) *Attorney, Agent, or Firm* — Jeffrey A. Sharp (57) ABSTRACT

A method of controlling iron in a hydrometallurgical process is disclosed. The method may comprise the steps of: leaching (14, 114) a feed slurry (2, 102); forming a pregnant leach solution (12a, 12b; 112a, 112b); removing a first leach residue (18, 118) from the pregnant leach solution (12a, 12b); and sending a portion (12b, 112b) of the pregnant leach solution (12a, 12b) and/or raffinate (22, 122) produced therefrom, to an iron removal process (34, 134). According to some preferred embodiments, the iron removal process (34, 134) may comprise the steps of: sequentially processing the pregnant leach solution (12a, 12b) and/or raffinate (22, 122) produced therefrom in a first reactor ($R_1$) a second reactor ($R_2$), and a third reactor ($R_3$); maintaining a pH level of the first reactor ($R_1$) above 4, by virtue of the addition of a first base; maintaining a pH level of the second ($R_2$) and/or third ($R_3$) reactors above 8.5, by virtue of a second base; and forming solids (46) comprising magnetite (68). The method may further comprise the steps of performing a solid liquid separation step (36) after the iron removal process (34, 134); and performing a magnetic separation step (64) to remove
(Continued)

magnetite (68) from said solids comprising magnetite (68), without limitation. A system for performing the method is also disclosed.

10 Claims, 7 Drawing Sheets

(51) Int. Cl.
    *C22B 3/44*          (2006.01)
    *C22B 3/00*          (2006.01)

(52) U.S. Cl.
    CPC ...... *C22B 23/0415* (2013.01); *C22B 23/0461* (2013.01); *Y02P 10/234* (2015.11); *Y02P 10/236* (2015.11)

(58) Field of Classification Search
    USPC ........................................................ 75/10.67
    See application file for complete search history.

(56) References Cited

OTHER PUBLICATIONS

Han Haisheng et al, Magnetite precipitation for iron removal from nickel-rich solutions in hydrometallurgy process, Jan. 6, 2016, 318-322 Elsevier Scientific.
The International Search Report and Written Opinion dated Feb. 28, 2018, 10 pages.

FIGURE 8

METHODS FOR CONTROLLING IRON VIA MAGNETITE FORMATION IN HYDROMETALLURGICAL PROCESSES

REFERENCE TO RELATED APPLICATIONS

This application is a U.S. National Stage entry of PCT/IB2017/057553 filed 30 Nov. 2017, which claims priority to U.S. Provisional Patent Application No. 62/428,895 filed on Dec. 1, 2016.

FIELD OF THE INVENTION

Embodiments of the invention relate to equipment and processes concerning hydrometallurgical processing of slurries containing metals. In particular, embodiments of the invention relate to methods of precipitating iron in hydrometallurgical processes. More particularly, are methods of forming magnetite from leach liquors of copper concentrates, nickel laterites, zinc concentrates and acid mine drainage, as will be described in further detail hereinafter.

BACKGROUND OF THE INVENTION

Iron removal from process solutions may be considered to be the technical and economic crux of hydrometallurgical processing. This is because large volumes of waste can be generated through precipitation steps, at the further expense of high reagent costs, water consumption, and final waste impoundment. While tenable for heap leach operations (due to the small quantities of iron in such heap leach operations), the amount of iron that can be generated during chalcopyrite leaching, zinc leaching, and/or nickel laterite leaching can make it cost prohibitive to treat/remove soluble iron from a hydromet circuit using traditional methods. In particular, iron(II) (i.e., $Fe^{2+}$) can substantially build up in chalcopyrite leach circuits and heap leach circuits, since raffinate-recycle streams coming from solvent extraction/electrowinning (SX/EW) circuits aren't efficiently configured to handle or remove excess residual iron economically.

The predominate oxidation state of iron during chalcopyrite leaching and heap leaching is +2. Accordingly, a costly oxidation step would generally be required prior to the precipitation of iron in such leaching circuits. For nickel laterite leaching, buildup of iron(III) in solution may require very expensive, high temperature autoclave operations, and these high temperatures tend to drive reactions towards the formation of less desirable species such as basic iron sulfate and hematite.

Accordingly, in order to make certain leaching methods more economical and/or able to produce more desirable iron-based byproducts (e.g., magnetite), an alternative method for iron removal is proposed herein. This novel alternative method of removing iron may apply to chalcopyrite leaching as well as other hydrometallurgical applications where iron removal is essential (e.g., acid mine drainage, zinc leaching, nickel laterite leaching, etc.), without limitation.

Current state-of-the-art iron removal practices generally involve only a two-step pH change; wherein, in a first stage, limestone or lime may be used to neutralize free acid and precipitate gypsum and iron as an iron hydroxide, preferably goethite. Other metals, such as zinc (Zn), Magnesium (Mg), and Manganese (Mn), etc., may then be precipitated in a second stage having a pH greater than 9. With these conventional two-stage impurity removal processes, low-density/high-surface area ferric hydroxides are formed, which are typically difficult to settle and filter. Moreover, with these conventional two-stage iron removal processes, metal values still in solution along with the precipitates are typically disposed of as tails and are rarely recovered. Moreover, with these conventional two-stage iron removal processes, all copper present in post-iron precipitation treated liquors can be lost to tailings, and therefore, streams that are selected for iron removal, or that can be adequately treated for iron removal are limited (this is especially true for copper-leaching circuits). The voluminous nature of the ferric hydroxide precipitates, high water entrainment, and significant copper losses make iron removal a costly endeavor from both an economic and environmental perspective. Moreover, with conventional iron-removal processing, large tailings impoundments are typically necessary and with the added disadvantage of significant water inventory trapped as hydrated iron species.

In short, conventional iron removal processes promote the formation of iron hydroxides that filter poorly, upset flowsheet water balance, co-precipitate with copper, lead to metal value losses, and fail to provide desirable iron byproducts.

The following references may be relevant to this application: U.S. Pat. No. 4,150,095 A (KUNDA WASYL ET AL); WO 2007/071020 A1 (HARRIS G BRYN ET AL); CHANG Y ET AL: "Removal of iron from acidic leach liquor of lateritic nickel ore by goethite precipitate", HYDROMETALLURGY, ELSEVIER SCIENTIFIC PUBLISHING CY. AMSTERDAM, NL, vol. 101, no. 1-2, 1 Feb. 2010 (2010-02-01), pages 84-87, XP026851826, ISSN: 0304-386X [retrieved on 2009 Nov. 27]; and, HAN HAISHENG ET AL: "Magnetite precipitation for iron removal from nickel-rich solutions in hydrometallurgy process", HYDROMETALLURGY, ELSEVIER SCIENTIFIC PUBLISHING CY. AMSTERDAM, NL, vol. 165, 22 Jan. 2016 (2016-01-22), pages 318-322, XP029700384, ISSN: 0304-386X, DOI: 10.1016/J.HYDROMET.2016.01.006

OBJECTS OF THE INVENTION

It is, therefore, an object of some embodiments of the present invention, to provide an improved hydrometallurgical process which may be adequately configured to selectively leach zinc, magnesium, and/or manganese (e.g., from other metals such as copper) both fully and rapidly, in a stepwise process, without limitation.

It is a further object of some embodiments of the present invention, to provide an improved hydrometallurgical process which may provide a cost effective iron removal process with minimal copper losses and reduced tailings volume, without limitation.

It is a further object of some embodiments of the present invention, to provide an improved hydrometallurgical process which involves the continuous production of and/or continuous formation of magnetite, in the presence of pay metals and which can be easily magnetically separated for iron removal and recovery, without limitation.

It is a further object of some embodiments of the present invention, to provide an improved hydrometallurgical process which uses soluble copper and iron precursors to precipitate magnetite, cuprite, gypsum, and other metal-oxide phases from hydrometallurgical liquors, without limitation.

It is a further object of some embodiments of the present invention, to provide an improved hydrometallurgical process which uses electron donors or acceptors to precipitate magnetite, gypsum, and other metal-oxide phases from hydrometallurgical liquors, without limitation.

It is a further object of some embodiments of the present invention, to provide an improved hydrometallurgical process which, through stepwise leaching of a precipitate comprising magnetite solids and other metals, can allow pay metals (such as Zn and Cu) to be subsequently selectively and/or independently recovered from the precipitate (e.g., after iron precipitation) without limitation.

It is a further object of some embodiments of the present invention, to provide an improved hydrometallurgical process wherein magnetite can be separated through a combination of density and/or magnetic separation techniques to produce a saleable iron product, without limitation.

It is a further object of some embodiments of the present invention, to provide an improved hydrometallurgical process wherein by virtue of high pH environments (e.g., due to the addition of carbonates) and unique electron exchange chemistry, a minimal amount of highly-hydrated, voluminous iron hydroxides are formed during the iron removal process, without limitation.

It is a further object of some embodiments of the present invention, to provide an improved hydrometallurgical process wherein little more than gypsum is sent to tails, and metal losses are mitigated, without limitation.

It is a further object of some embodiments of the present invention to provide a process island that may be configured to work within a number of different hydrometallurgical processes, including, but not limited to: metal sulfide leaching processes, copper leaching processes, zinc leaching processes, nickel laterite leaching processes, chalcopyrite leaching processes, acid mine drainage processing, and the like, without limitation.

These and other objects of the present invention will be apparent from the drawings and description herein. Although every object of the invention is believed to be attained by at least one embodiment of the invention, there is not necessarily any one embodiment of the invention that achieves all of the objects of the invention.

BRIEF DESCRIPTION OF THE DRAWINGS

To complement the description which is being made, and for the purpose of aiding to better understand the features of the invention, a set of drawings illustrating non-limiting preferred embodiments of new methods for precipitating iron in hydrometallurgical processes is attached to the present specification as an integral part thereof, in which the following has been depicted with an illustrative and non-limiting character. It should be noted that elements sharing similar features may be represented with similar reference numerals, without limitation. A non-limiting list of identifying numerals and definitions thereof appear at the end of this description.

FIG. 3 represents photos from batch work performed according to some embodiments. A batch iron removal process was employed, using a jacketed glass beaker with a magnetic stir bar. As suggested by the right portion of the figure, as the reactor's pH level was gradually increased (i.e., to approximately pH level 10 with appropriate residence time), magnetite was formed, turning the contents of the reactor a dark-black color. It follows that if i.) the pH level of a copper PLS is increased to greater than about 8.5 (e.g., around 9.0 and above), ii.) the molar ratio of copper to iron during the bulk leach is approximately 2:3, and iii.) a majority of the iron in solution is in the 2+ state, then solids containing magnetite can advantageously be precipitated out of solution, and the formation of cumbersome ferric hydroxides can be avoided.

FIG. 5 is an exemplary flowsheet incorporating iron removal 34 and magnetite separation 64 into a process 1 involving the hydrometallurgical leaching 14 of primary copper sulfides, according to some non-limiting embodiments. As suggested by the embodiment shown in FIG. 6, an iron bleed stream 12*b* of pregnant leach solution (PLS) may be sent to a multi-stage reactor having three chambers (i.e., $R_1$, $R_2$, $R_3$). Alternatively, while not explicitly shown, an iron bleed stream 12*b* of pregnant leach solution (PLS) may be sent to separate reactors which are arranged in series. For example, while not explicitly shown, iron bleed stream 12*b* of pregnant leach solution (PLS) may be sent to a first reactor ($R_1$), and then to a second reactor ($R_2$), and then to a third ($R_3$) reactor, without limitation. PLS 12*b* may be processed, instead of raffinate 22, in order to dramatically reduce reagent consumption. Such embodiments are made possible because of the downstream options for copper recovery from the metal oxide/magnetite residue. These options include, without limitation, magnetic separation of iron components, and sequential, mild acidic leaching of pay metal oxides such as copper and zinc oxides.

The solids recovered from the iron removal process 134 and a subsequent solid/liquid separation step 136 may be magnetically screened 162 to recover magnetite 166 therefrom.

In the following, the invention will be described in more detail with reference to drawings in conjunction with exemplary embodiments.

SUMMARY OF THE INVENTION

Disclosed, is a method of controlling iron in a hydrometallurgical process, via magnetite formation, separation and recovery. According to some embodiments, the method may comprise the steps of: leaching 14, 114 a feed slurry 2, 102; forming a pregnant leach solution 12a, 12b; 112a, 112b; removing a first leach residue 18, 118 from the pregnant leach solution (12a, 12b; and sending a portion 12b, 112b of the pregnant leach solution 12a, 12b and/or raffinate 22, 122 produced therefrom, to an iron removal process 34, 134. The iron removal process 34, 134 may comprise the steps of: sequentially processing the pregnant leach solution 12a, 12b and/or raffinate 22, 122 produced therefrom in a first reactor ($R_1$), a second reactor ($R_2$), and a third reactor ($R_3$); maintaining a pH level of the first reactor ($R_1$) in the range of 4-5, by virtue of the addition of a first base; maintaining a pH level of the second ($R_2$) and/or third ($R_3$) reactors above 8.5, by virtue of a second base; and forming solids 48 comprising magnetite 68, without limitation. Methods according to the invention may further comprise the steps of performing a solid/liquid separation step 36 after the iron removal process 34, 134; and performing a magnetic separation step 64 to remove magnetite 68 from said solids 48 comprising magnetite 68, without limitation.

According to some embodiments, the method may further comprise the step of controlling the step of leaching 14, 114 a feed slurry 2, 102 such that the molar ratio of copper (Cu) to iron (Fe) is approximately 2:3. According to some embodiments, the method may further comprise the step of maintaining more than 95% of the iron (Fe) in the 2+ state.

According to some embodiments, the method may further comprise the step of discouraging the formation of iron hydroxide during the step of forming solids 48 comprising magnetite 68.

According to some embodiments, the method may further comprise the step of adding oxygen to the first reactor ($R_1$)—in particular, for embodiments wherein the feed slurry 2, comprises a copper concentrate formed from chalcopyrite.

According to some embodiments, the method may further comprise the step of leaching 44 a first metal value from the solids 38 comprising magnetite 68, in order to remove a first metal value, before the step of performing a magnetic separation step 64 to remove magnetite 68 is performed. For example, the first metal value may comprise zinc, magnesium, and/or manganese, without limitation. According to some embodiments, the method may further comprise the step of leaching 54 a second metal value from the solids 48 comprising magnetite 68, in order to remove a second metal value, before the step of performing a magnetic separation step 64 to remove magnetite 68 is performed, but after the step of leaching 44 a first metal value, without limitation. For instances wherein a second metal value recovery step is utilized, the first metal value may comprise zinc, magnesium, and/or manganese in solution, and the second metal value comprises copper in solution, without limitation.

According to some embodiments, the method may further comprise the copper in solution produced during the second metal value recovery step 54 may be combined with a portion 12a, 112a of the pregnant leach solution 12a, 12b; 112a, 112b entering a solvent extraction 24, 124 system, without limitation. According to some embodiments, the step of leaching 44 a first metal value may be performed at a pH level above 5, and the step of leaching 54 a second metal value may be performed at a pH level below 4 and above 0.5, without limitation. According to some embodiments, the method may further comprise the step of adding a reductant to the first reactor ($R_1$)—in particular, if the feed slurry 102 comprises nickel laterite. Seeding of the first reactor ($R_1$), second reactor ($R_2$), and/or third reactor ($R_3$) may be performed using some of the solids 48 comprising magnetite 68, which may be recovered during solid/liquid separation step 46.

DETAILED DESCRIPTION OF THE INVENTION

The following description of the non-limiting embodiments shown in the drawings is merely exemplary in nature and is in no way intended to limit the inventions disclosed herein, their applications, or uses.

The inventors have developed a novel process 1 which can use copper and iron to precipitate magnetite, cuprite, gypsum, and metal-oxide phases from hydrometallurgical liquors. Through stepwise leaching of the precipitate, pay metals, such as zinc (Zn) and copper (Cu), can optionally be selectively captured from the residue and also processed (see FIG. 5). Magnetite 68 contained in precipitate 38 generated during a novel iron removal process 34, 134 can be subsequently separated through a combination of density 36 and magnetic separation 64 techniques to produce a salable iron product 68. In some embodiments, multiple density separation steps 36, 46, 56 may be employed, without limitation. In preferred embodiments, the only material sent to tails is gypsum 62.

The iron removal process 34, 134 may serve to remove bulk cations from solution through pH changes which are much greater than those currently known in the art (e.g., pH levels above 9). As suggested in the figures (e.g., FIG. 6), optional sequential recovery 40, 50 of pay metals 42, 52 may be employed, wherein one type of pay metal may be leached at a time, in stepwise fashion. Magnetic separation 64 to remove magnetite 68 may occur at any point or points within the process 1, 100 after iron removal (precipitation step 34, 134); however, it preferably occurs towards the end of the process 1, 100; for example, after optional selective recovery 40, 50 of pay metals 42, 52 (see FIG. 5).

As suggested in the figures, a continuous magnetite formation process may be employed. For instance, magnetite may be continuously formed, in order to economically remove iron from chalcopyrite leach pregnant leach solution (PLS). Iron may be removed from the chalcopyrite PLS while: i.) recovering copper as an acid soluble phase and/or ii.) forming magnetite as the sole iron phase for easy separation, without limitation.

Benefits of this process over conventional iron hydroxide precipitation are many. For example, without limitation, a saleable, dense, and easily separable/filterable iron product may be produced. Moreover, a recoverable copper product may be produced (i.e., downstream of iron removal), thereby resulting in negligible copper losses as compared to current state-of-the-art processes. Additionally, with embodiments of the present invention, there may be no need for an external oxidant (which, thereby, reduces reagent costs). Lastly, the potential exists that methods, systems, and flowsheets described herein could eventually replace conventional solvent extraction (SX) systems.

The chemistry involved in preferred embodiments is preferably as follows. Copper ($Cu^{2+}$) and iron ($Fe^{2+}$) react with one another to form goethite (FeOOH), which further reacts with $Fe^{2+}$ to product magnetite ($Fe_3O_4$). Cuprite ($Cu_2O$) may also be produced during the process. Ideal stoichiometry may be found in Equation (1) below. Additional chemical details may be found in Equations (2) through (5). If there is not enough $OH^-$ in a particular embodiment, then equation (6) may apply. If there is not enough $Fe^{2+}$ in a particular embodiment, then residual goethite may be present in the iron product.

$$2Cu^{2+}+3Fe^{2+}+5H_2O \rightarrow Cu_2O+Fe_3O_4+10H^+ \quad (1)$$

$$2Cu^{2+}+2Fe^{2+} \rightarrow 2Cu^++2Fe^{3+} \quad (2)$$

$$2Cu^++OH^- \rightarrow Cu_2O+H^+ \quad (3)$$

$$2Fe^{3+}+4H_2O \rightarrow 2FeOOH+6H^+ \quad (4)$$

$$2FeOOH+Fe^{2+}+2OH^- \rightarrow Fe_3O_4+2H_2O \quad (5)$$

$$2Cu+ \rightarrow Cu^0+Cu^{2+} \quad (6)$$

Figure 1:
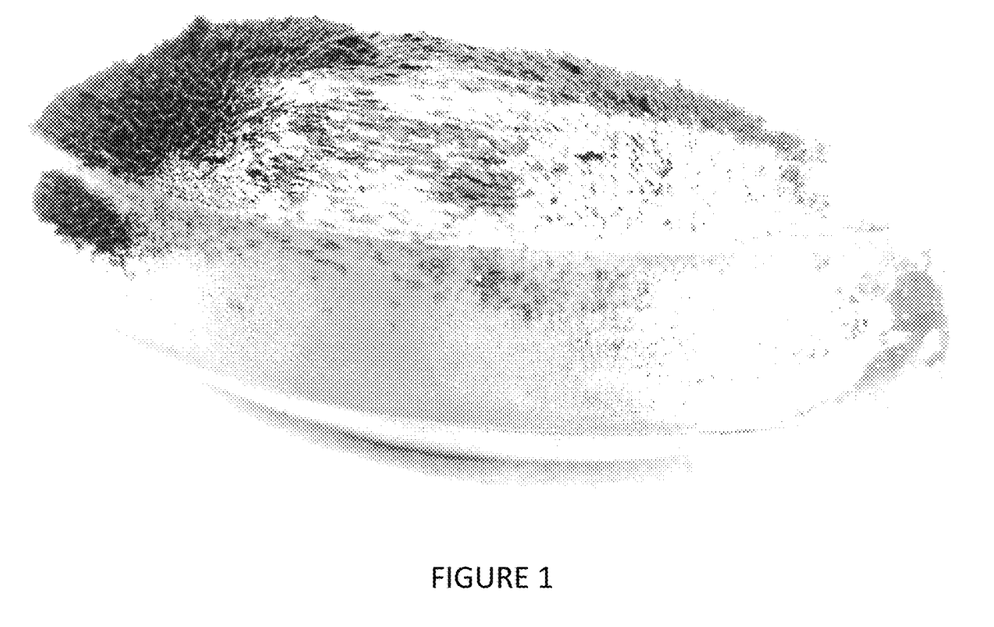
FIG. 1 shows an example of magnetite which may be formed according to some embodiments of the methods described herein, without limitation. Shown, are magnetically-separated solids largely composed of magnetite.
Figure 2:
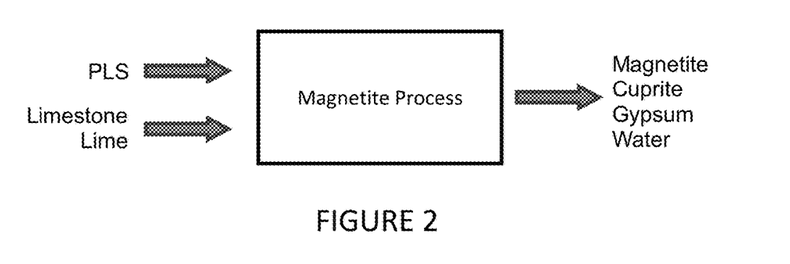
FIG. 2 shows a schematic diagram of a hydrometallurgical process 1 according to some embodiments; wherein the process 1 comprises the step of continuously forming products of magnetite, cuprite, gypsum, and water from reactants including pregnant leach solution (PLS), and limestone or lime. In the embodiment shown in FIG. 2, copper PLS 12*b* is used as a reactant. It should be understood to those having an ordinary skill in the art, that raffinate 22, 122 may also be used in combination with, or in lieu of PLS 12*b*,112*b*, as a reactant, without limitation.
Figure 3:
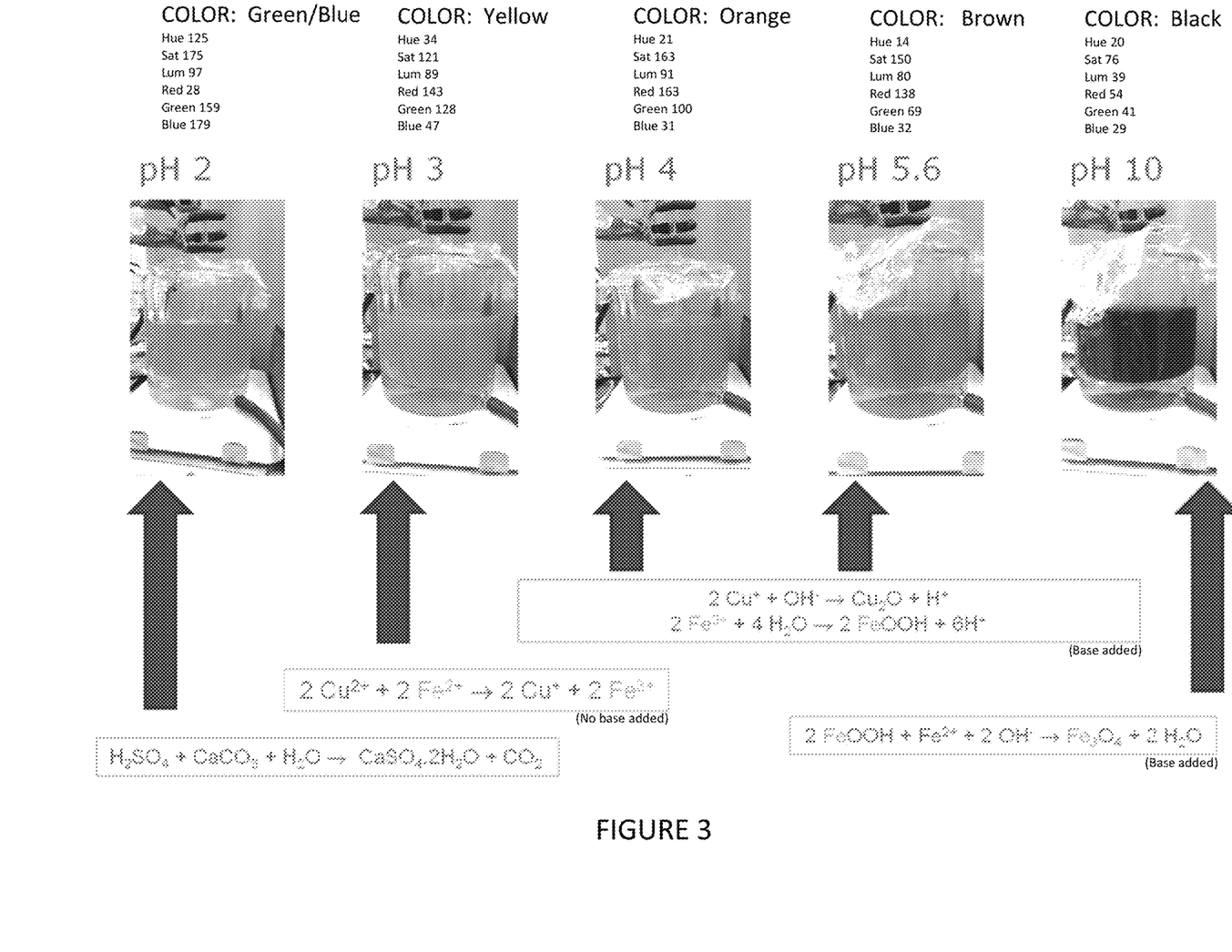
Figure 4:
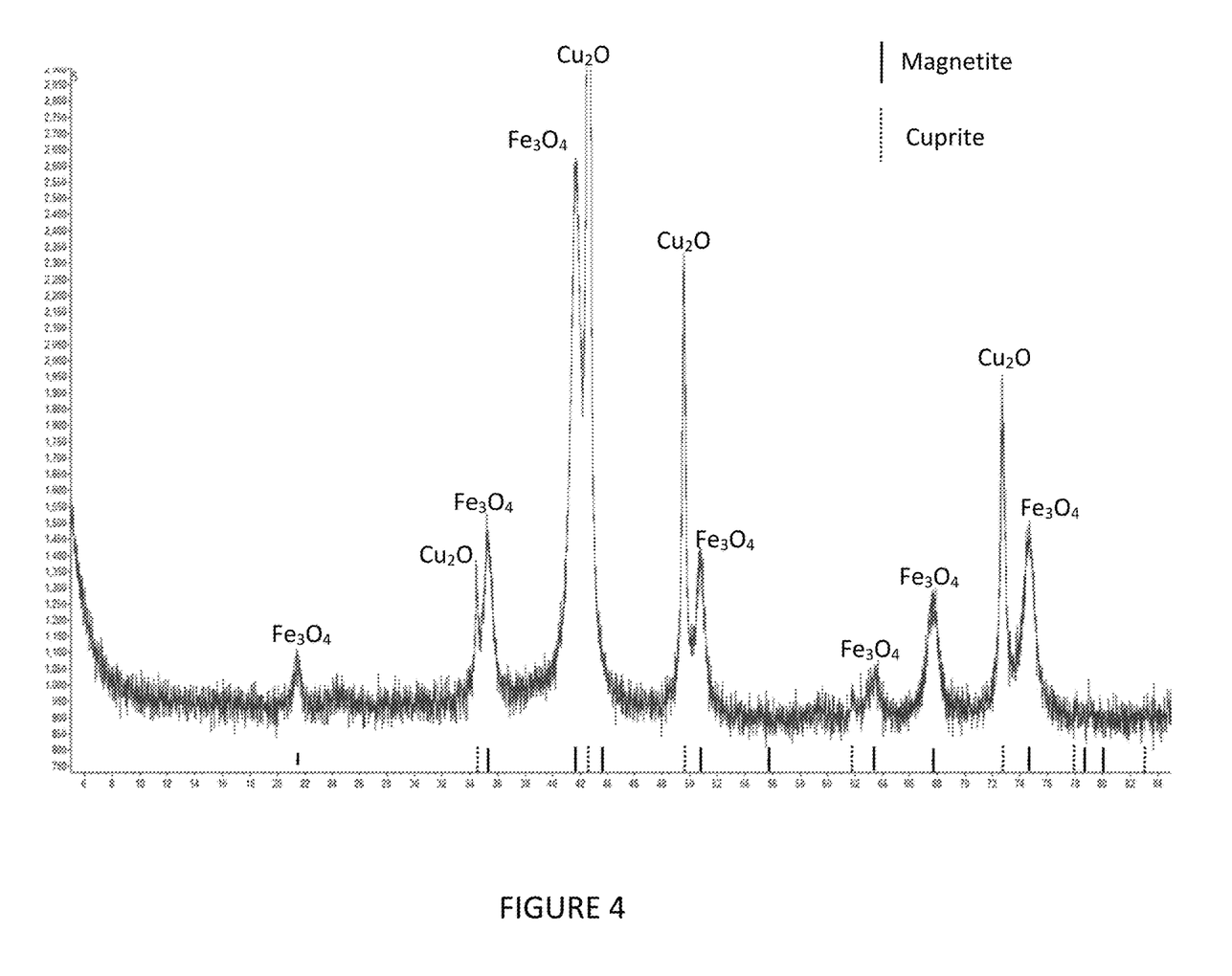
FIG. 4 is an X-ray diffractogram of the solids produced during the precipitation of copper and iron, from a synthetic hydrometallurgical leach liquor, according to some embodiments. It should be noted that the data shown in FIG. 4 utilized sodium hydroxide in order to increase pH levels. Accordingly, as shown in the diffractogram, no gypsum is shown to be present.
Figure 5:
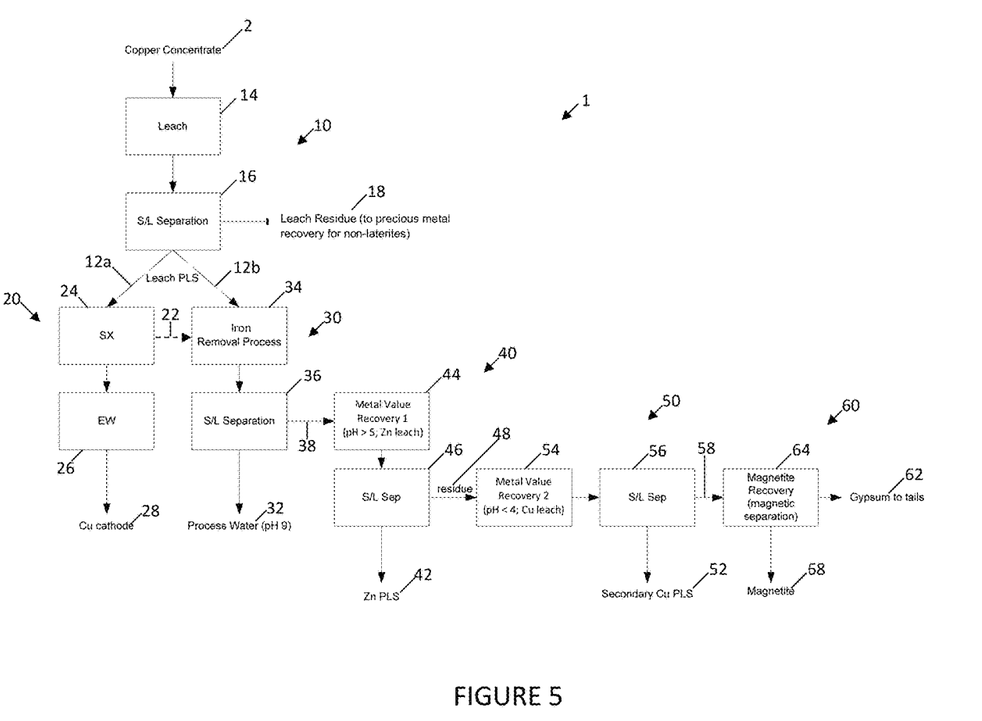
Figure 6:
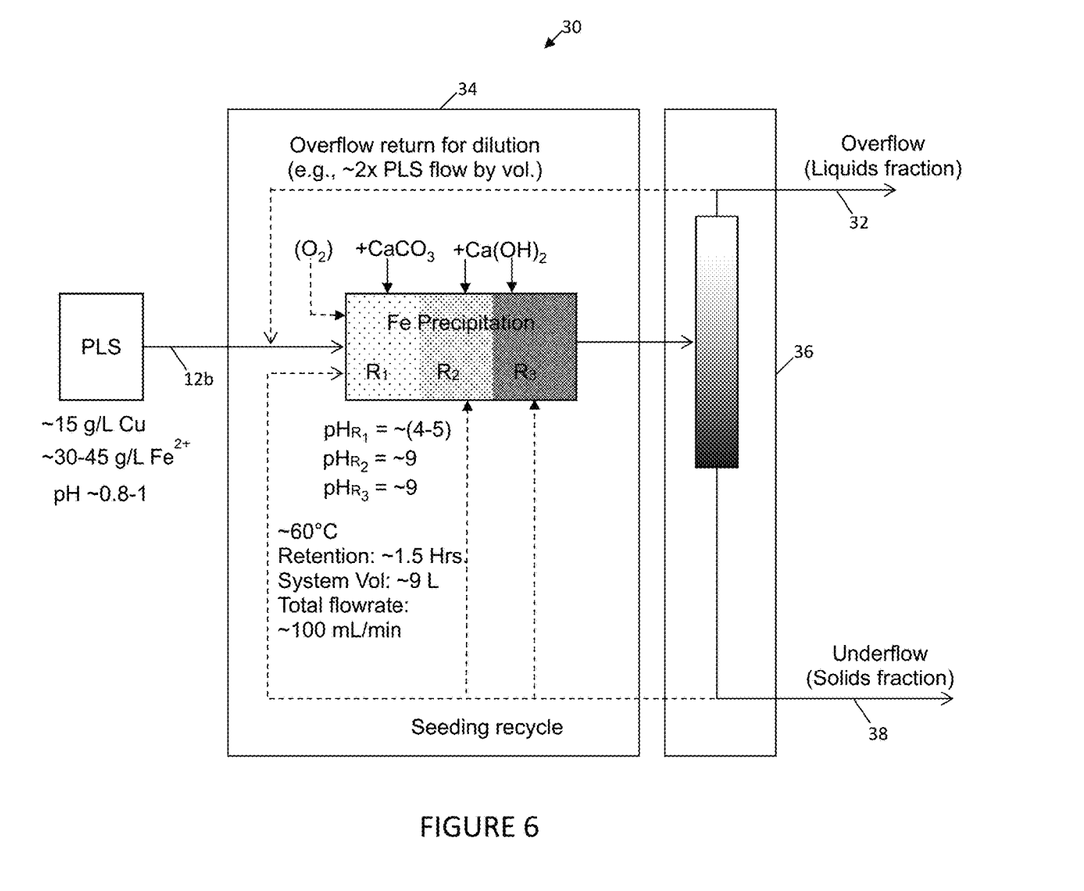
FIG. 6 shows a schematic pilot- or test-plant arrangement for copper PLS/raffinate processing according to some embodiments, wherein an iron removal process 34 may be run to steady state in order to produce product magnetite. Solution analysis and solids analysis at steady state may be performed for multi-stage reactor chamber number/reactor number three ($R_3$) overflow and thickener products, without limitation. The percent solids of the third reactor ($R_3$) overflow and underflow may also be measured/monitored. It should be understood that pH levels may be measured/monitored in reactor numbers one ($R_1$) and two ($R_2$), without limitation. In certain embodiments, iron precipitation can be performed in a series of continuous reactors which each employ at least one overhead stirrer, without limitation.
Figure 7:
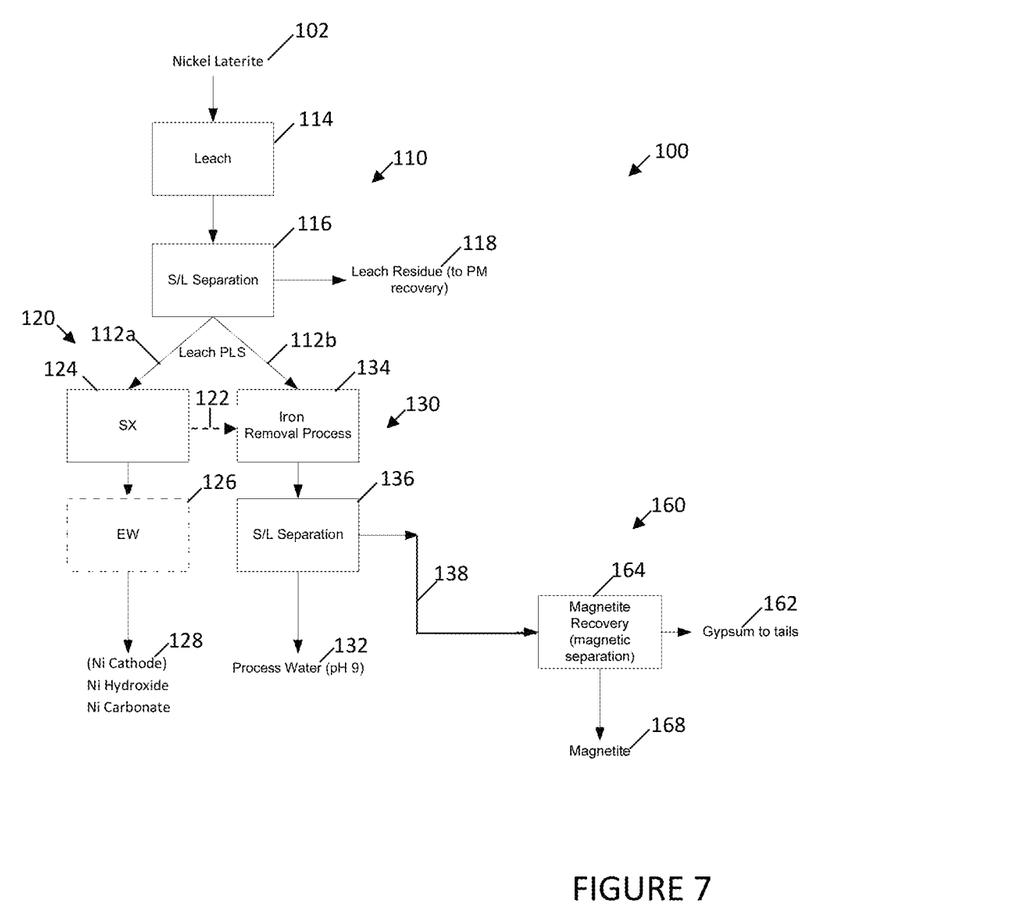
FIG. 7 suggests an example flowsheet which incorporates a magnetite iron removal process 134 into a process 1 involving the hydrometallurgical leaching 114 of nickel laterites 102, according to some non-limiting embodiments. In the embodiment shown in FIG. 7, raffinate 122 and/or PLS 112*b* may be sent to an iron removal process 134 as an iron bleed stream, so as to precipitate iron out of solution.
Figure 8:
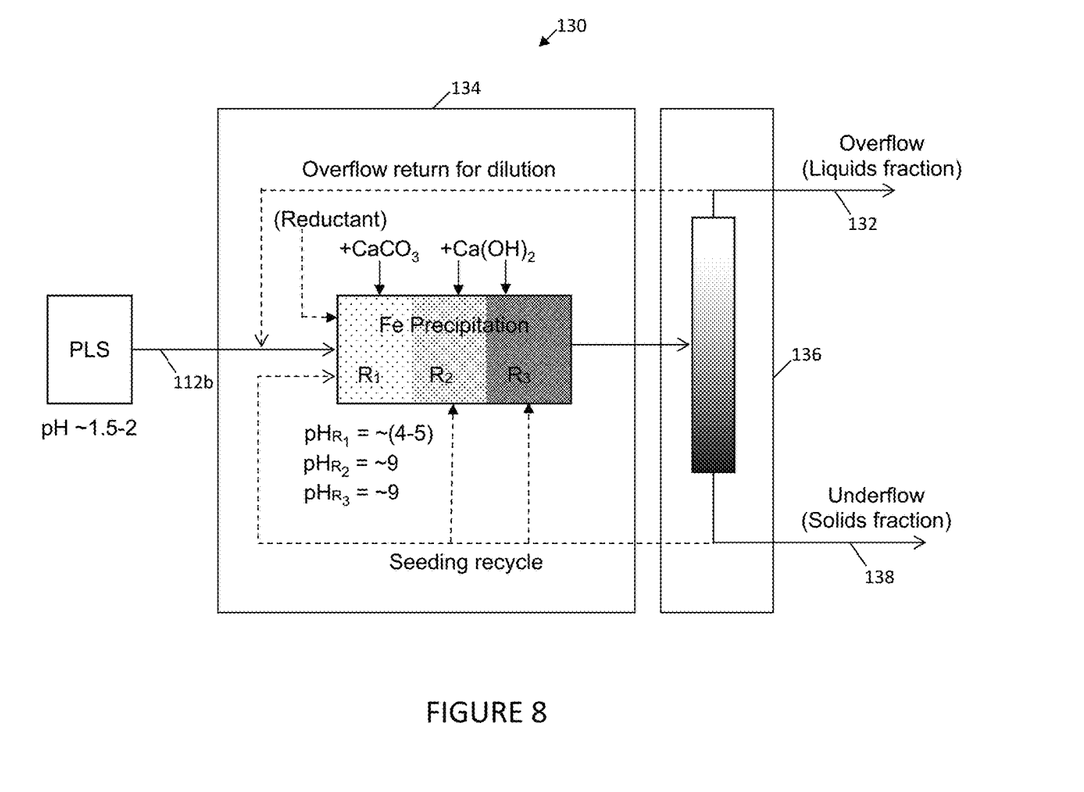
FIG. 8 shows a schematic plant arrangement for nickel laterite PLS/raffinate processing according to some embodiments, wherein an iron removal process 134 may be run to steady state, in order to produce product magnetite (refer to numeral 168 from FIG. 7). Solution analysis and solids analysis at steady state may be performed for reactor number three ($R_3$) overflow and thickener products, without limitation. The percent solids of the third reactor ($R_3$) overflow and underflow may also be measured/monitored. It should be understood that pH levels may be measured/monitored in reactor numbers one ($R_1$) and two ($R_2$), without limitation. In certain embodiments, iron precipitation can be performed in a series of continuous stainless steel reactors which may employ overhead stirrers, without limitation.

According to some preferred embodiments, as shown in flowsheet depicted in FIG. 5, a hydromet process 1 may be provided. The hydrometallurgical process 1 provided may comprise a first stage 10, a second stage 20, a third stage 30, a fourth stage 40, a fifth stage 50, and a sixth stage 60. The first stage 10 may comprise feeding a slurry, such as a copper concentrate 2 and necessary reagents to a leach portion 14 of the circuit 10, where leaching occurs. Slurry comprising pregnant leach solution (PLS) and leach residue particles leaving the leach step 14 may then undergo a solid/liquid separation step 16, wherein leach residue and other solids 18 may be removed. The separated leach residue/solids 18 may undergo separate precious metals recovery processing, without limitation. Copper-rich pregnant leach solution (PLS) leaving the solid/liquid separation step 16 may be split into two streams: a first PLS stream 12a which may enter the second stage 20, and a second PLS stream 12b which may enter the third stage 30. The first PLS stream 12a may comprise the bulk of the liquids (i.e., more than 50% of the liquids) leaving the solid/liquid separation step 16 of the first stage 10. The second PLS stream 12b may comprise an impurities bleed stream representing a small fraction of the total PLS produced from leaching 14, without limitation. The first PLS stream 12a may enter a solvent extraction (SX) step 24. Electrolyte exiting the solvent extraction (SX) step 24 may then undergo subsequent electrowinning 26 to produce copper cathode 28, without limitation.

The second PLS stream 12b may enter a magnetite iron removal process step 34 of the third stage 30. Details of a preferred embodiment of the iron removal step 34 of the third stage 30 may be found in FIG. 6 and Equations 1-5 above, without limitation. A solid/liquid separation step 36 may follow, creating a solids fraction stream 38, and a liquids stream 32. The liquids stream 32 may comprise mainly recyclable process water having an elevated pH level (e.g., pH 8-10+). For example, the liquids stream 32 may comprise process water having a pH of about 9 or above, without limitation. The solids stream 38 may enter a fourth stage 40, and undergo metal value recovery. As shown, a first base metal recovery step 44 may be employed. According to some preferred embodiments, the first base metal recovery step 44 may comprise a zinc (Zn) removal process wherein zinc (and/or other metals including, but not limited to magnesium and manganese) may be leached into solution at a pH greater than about 5, without limitation. A subsequent solid/liquid separation step 46 may be used to separate the metal values (e.g., zinc pregnant leach liquor 42) from solid residues 48 of the first base metal recovery step 44. The residues 48 may enter the fifth stage 50 and undergo a second base metal recovery step 54, as shown, without limitation. For example, the second base metal recovery step 54 may comprise a copper (Cu) recovery step, wherein copper may be leached into solution at a pH less than about 4 (but greater than about 0.5), without limitation. A subsequent solid/liquid separation step 56 may be used to separate the second metal value (e.g., copper pregnant leach liquor 52) from solids residues 58 of the second base metal recovery step 54. The solids fraction 58 may follow into a magnetite recovery step 64, wherein a magnet (e.g., magnetic belt, magnetic sorter, or the like) may separate out magnetite 68 from tails 62. In some preferred embodiments, the magnetite recovery step 64 may comprise, without limitation, a magnetic separation step to recover magnetite 68. Remaining material may substantially comprise gypsum 62, which may be sent to a tailings disposal site, without limitation.

EXAMPLE

An example of magnetite processing according to a particular embodiment of the invention follows. The purpose of the test was to produce magnetite and cuprite as solid products from synthetic hydrometallurgical liquor.

The experiment was conducted by providing a solution of 5.2 g $L^{-1}$ Cu and 8 g $L^{-1}$ Fe(II) and pH 2.8. The solution was placed in a magnetically-stirred beaker. The pH was adjusted step-wise, over a thirty minute period, with addition of sodium carbonate, to reach a final pH of 9.9. The system temperature was gradually increased from ambient (20° C.) to reach 50° C. after 20 minutes, and then allowed to gradually fall back to ambient temperature (20° C.) for the remainder of the experiment.

The results of the experiment were as follows. The iron and copper were completely removed from solution to form a dense, black precipitate. Analysis of the final liquor by ICP-AES indicated that copper and iron, if present, were below detection levels (approximately less than about 0.008 ppm Cu and approximately less than about 0.02 ppm Fe). Because sodium carbonate was used as the base in this example, no solid byproducts (e.g., such as gypsum) were formed in this reaction. Other tests (outside of the purview of this example) have indicated that the chemistry can be just as effective with the use of limestone, lime, caustic, or other bases in lieu of sodium carbonate.

An examination of the solid product by X-ray diffraction (XRD) found only magnetite and cuprite ($Cu_2O$) to be present (see Table 1, FIG. 5). The cuprite is believed to form through reduction of copper(II) and formation of iron(III).

The Cu/Fe molar ratio in the solids predicted from the XRD is higher than expected, indicating that some amorphous iron oxides may be present in the solids which are not visible by XRD. The ideal ratio of Cu(II) to Fe(II) in the absence of an external oxidant is approximately 1:1.5. This example utilized a 1:1.8 ratio of Cu(II) to Fe(II). Therefore, the excess iron likely formed an amorphous iron(II) oxide. In an ideal system, the necessary iron(II) to iron (III) ratio to create magnetite could be maintained through the combination of copper(II) and an oxidant such as an $O_2$-containing gas.

TABLE 1

Composition of solid residue by X-ray diffraction indicates only two phases are present- magnetite and cuprite.

| Phase | Weight Percent |
|---|---|
| Magnetite | 77 |
| Cuprite | 23 |

An example flowsheet for implementation of the magnetite iron removal process 34 in the leaching of primary copper sulfide concentrates is provided in FIG. 5. According to some preferred embodiments, copper concentrate 2 may be processed in a first stage 10 to form a pregnant leach solution (PLS). The pregnant leach liquor may be split, as shown, with an impurity bleed stream 12b of PLS flowing to third 30, fourth 40, fifth 50, and sixth 60 stages, without limitation. The impurity bleed stream 12b may represent less than 50% of the bulk PLS flowing to a solvent extraction 24/electrowinning 26 circuit. The third 30 stage may comprise an iron removal process 34 which is configured to selectively remove iron in the form of precipitated solids comprising magnetite 68 and other base metals. In a fourth stage 40, a metal value (e.g., zinc) may be leached 44 from the precipitated solids and into solution as a PLS 42. Leach residue solids 48 from the fourth stage 40 may enter the fifth stage 50, where another metal value (e.g., copper) may be leached 54 from solids 48 leaving the fourth stage 40. The second metal value may enter into solution as a PLS 52 which can be combined with a bulk PLS stream 12a or processed separately. Solids 58 exiting the fifth stage 50 may enter a magnetite removal step 64 of the sixth stage 60. The magnetite removal step 64 may comprise magnetic separation techniques which serve to facilitate the removal magnetite 68 from gypsum tailings 62, without limitation.

A bulk 12a of the PLS may travel to an SX/EW circuit 24, 26, and although not expressly shown, downstream copper products 52 may be combined therewith. Dissolved metals in the impurities bleed stream 12b are precipitated as magnetite 66 and other metal-oxides. After a solid/liquid separation step 36, basic clean water 38 can be recycled to one or more reactors ($R_1$, $R_2$, $R_3$) within the iron removal process 34. Solids 38 procured through the iron removal process 34 may undergo downstream selective leaching using stepwise pH changes as shown. Some of the solids 38 recovered from solid/liquid separation 36 may be recycled to the one or more reactors ($R_1$, $R_2$, $R_3$) within the iron removal process 34 for seeding purposes, without limitation.

Zinc oxide (as well as other oxides including Mn, Mg, etc.) may be dissolved at a pH above 5 (e.g., between 5 and 7; 5<pH<7) in a first base metal value recovery step 44, in order to generate a first metal value PLS 48 (e.g., a zinc PLS as shown). The metal value PLS 48 can be purified by solvent extraction (SX), followed by electrowinning; or, the PLS 48 may be used for the production of pure zinc carbonate (not shown). Solids 48 from a subsequent solid/liquid separation step 46 (following the base metal recovery step 44) may be washed at a pH less than 4 (i.e., 0.5<pH<4), in a subsequent base metal recovery step 54. The subsequent base metal recovery step 54 may comprise, for instance, a copper recovery step, where cuprite is dissolved into solution, without limitation. Slurry 58 from the second base metal recovery step 54 may undergo a solid/liquid separation step 56, for example, in order to produce a copper-rich liquor 52 as shown. In some embodiments, copper-rich liquor 52 produced in the fifth stage 50 of the process 1 can be combined with the original PLS stream 12a entering copper SX/EW circuits 24, 26, without limitation. Solids 58 from the solid/liquid separation step 56 may then undergo magnetic separation 64, for example, in order to pull clean magnetite 66 therefrom. The remaining residue 62 from the magnetite recovery step 64 may primarily comprise gypsum 62, and may be sent to a tailings impoundment or processed further, without limitation.

In some embodiments, it is envisaged that a flowsheet could treat raffinate 22, 122 as opposed to a pregnant leach solution (PLS) 12b,112b, without limitation. In some embodiments, it is envisaged that a flowsheet could treatment both raffinate 22, 122 and pregnant leach solution (PLS) 12b,112b, together, at the same time, without limitation. In some embodiments, while not shown, portions of the flowsheets shown in FIGS. 5-8 could also be used for processing raffinate produced from zinc leach operations, acid mine drainage, and/or other liquors where iron removal may be necessary, without limitation.

It should be made known that the particular features, processes, and benefits which are shown and described herein in detail are purely exemplary in nature and should not limit the scope of the invention. For example, for copper concentrate leach circuits, oxygen ($O_2$) may be bubbled into the first reactor ($R_1$) of the iron removal process 34, in order to promote a 1:2 Fe(II) to Fe(III) ratio, without limitation. At pH levels greater than 4, where Fe(II) and Cu(II) are present, Cu(I) and Fe(III) is typically produced and therefore, it may not be necessary to bubble oxygen ($O_2$) into the first reactor ($R_1$). For embodiments where raffinate 22 is used in an iron removal process 34 within a copper concentrate 2 processing plant (whether alone, or in combination with copper-rich PLS 12b), it may be necessary to increase the amount of oxygen and/or the amount base agent added to the first reactor ($R_1$), because the incoming feed stream 22, 112b to the iron removal process 34 may have a lower copper tenor and/or a lower pH, without limitation. As suggested in FIG. 8, for embodiments which are adapted for processing nickel laterites 102, a reducing agent (rather than oxygen) may need to be added to the first reactor ($R_1$), because the incoming feed 112b to the iron removal process 134 may be comprised of mostly iron in the +3 state (i.e., Fe(III)). Accordingly, a reducing agent may be employed as necessary to ensure that the molar ratio of iron(II) to iron (III) is close to 1:2 for the proposed chemistry to work best.

Although the invention has been described in terms of particular embodiments and applications, one of ordinary skill in the art, in light of this teaching, can generate additional embodiments and modifications without departing from the spirit of or exceeding the scope of the claimed invention. Accordingly, it is to be understood that the descriptions herein are proffered by way of example to facilitate comprehension of the invention and should not be construed to limit the scope thereof.

REFERENCE NUMERAL IDENTIFIERS 1, 100 hydrometallurgical process
2, 102 feed slurry (e.g., concentrate, metal sulfide concentrate, copper concentrate)
10, 110 first stage (e.g., primary leach circuit)
12a, 112a liquids fraction 1, first pregnant leach solution (PLS) stream (e.g., bulk stream @>50%)
12b, 112b liquids fraction 2, second pregnant leach solution (PLS) stream (e.g., bleed stream @<50%)
14, 114 leach step (e.g., vat leaching, heap leaching)
16, 116 solid/liquid separation step (e.g., thickener)
18, 118 solids fraction (e.g., leach residue)
20, 120 second stage (e.g., solvent extraction circuit)
22, 122 raffinate stream
24, 124 solvent extraction step
26, 126 electrowinning step (shown as optional in FIG. 7)
28, 128 cathode/bulk metal value (e.g., copper, nickel, nickel hydroxide, nickel carbonate)
30, 130 third stage (e.g., iron removal circuit)
32, 132 liquids fraction (e.g., clean stream of process water for recycle)
34, 134 iron removal step (e.g., iron precipitation)
36, 136 solid/liquid separation step (e.g., thickener)
38, 138 solids fraction (e.g., iron-containing precipitated solids)
40 fourth stage (e.g., first metal value recovery steps/circuit)
42 liquids fraction (e.g., first metal value PLS)
44 first metal value recovery step (e.g., zinc leach step)
46 solid/liquid separation step (e.g., thickener)
48 solids fraction (e.g., substantially zinc-free leach residue)
50 fifth stage (e.g., second metal value recovery steps/circuit)
52 liquids fraction (e.g., second metal value PLS)
54 second metal value recovery step (e.g., copper leach step)
56 solid/liquid separation step (e.g., thickener)
58 solids fraction (e.g., substantially copper and zinc-free leach residue)
60, 160 sixth stage (e.g., magnetite recovery circuit)
62, 162 solids fraction (e.g., substantially copper, zinc, and magnetite-free gypsum tails)
64, 164 magnetic separation step
68, 168 magnetite

The invention claimed is:

1. A method of controlling iron in a hydrometallurgical leach process (1) comprising the steps of:
   leaching (14, 114) a feed slurry (2, 102);
   forming a pregnant leach solution (12a, 12b; 112a, 112b);
   removing a first leach residue (18, 118) from the pregnant leach solution (12a, 12b); and
   sending a portion (12b, 112b) of the pregnant leach solution (12a, 12b) and/or raffinate (22, 122) produced therefrom, to an iron removal process (34, 134);
   wherein the iron removal process (34, 134) comprises:
   sequentially processing the pregnant leach solution (12a, 12b) and/or raffinate (22, 122) produced therefrom in a first reactor ($R_1$) a second reactor ($R_2$), and a third reactor ($R_3$);
   maintaining a pH level of the first reactor ($R_1$) in the range of 4-5, by virtue of an addition of a first base;
   maintaining a pH level of the second ($R_2$) and/or third ($R_3$) reactors above 8.5, by virtue of an addition of a second base; and
   forming solids (46) comprising magnetite (68);
   performing a solid liquid separation step (36) after the iron removal process (34, 134); and
   performing a magnetic separation step (64) to remove magnetite (68) from said solids comprising magnetite (68).

2. The method of claim 1, further comprising a step of controlling the step of leaching (14, 114) a feed slurry (2, 102) such that the molar ratio of copper (Cu) to iron (Fe) is approximately 2:3.

3. The method of claim 1, further comprising a step of adding oxygen to the first reactor ($R_1$).

4. The method of claim 3, wherein the feed slurry (2, 102) comprises a copper concentrate formed from chalcopyrite.

5. The method of claim 1, further comprising a step of leaching (44) a first metal value from the solids (46) comprising magnetite (68) to remove a first metal value before the step of performing a magnetic separation step (64) to remove magnetite (68).

6. The method of claim 5, wherein the first metal value comprises zinc, magnesium, and/or manganese.

7. The method of claim 5, further comprising a step of leaching (54) a second metal value from the solids (46) comprising magnetite (68) to remove a second metal value before the step of performing a magnetic separation step (64) to remove magnetite (68), and after the step of leaching (44) a first metal value.

8. The method of claim 7, wherein the first metal value comprises zinc, magnesium, and/or manganese in solution, and wherein the second metal value comprises copper in solution.

9. The method according to claim 8, wherein the copper in solution is combined with a portion (12a, 112a) of the pregnant leach solution (12a, 12b; 112a, 112b) entering a solvent extraction (24, 124) system.

10. The method of claim 7, wherein the step of leaching (44) a first metal value is performed at a pH level above 5, and wherein the step of leaching (54) a second metal value is performed at a pH level below 4 and above 0.5.

* * * * *